Dec. 28, 1965    J. R. A. BERLINE    3,225,933
MOUNTING FOR CLUSTER OF FILTER TUBES

Filed July 25, 1961    2 Sheets-Sheet 1

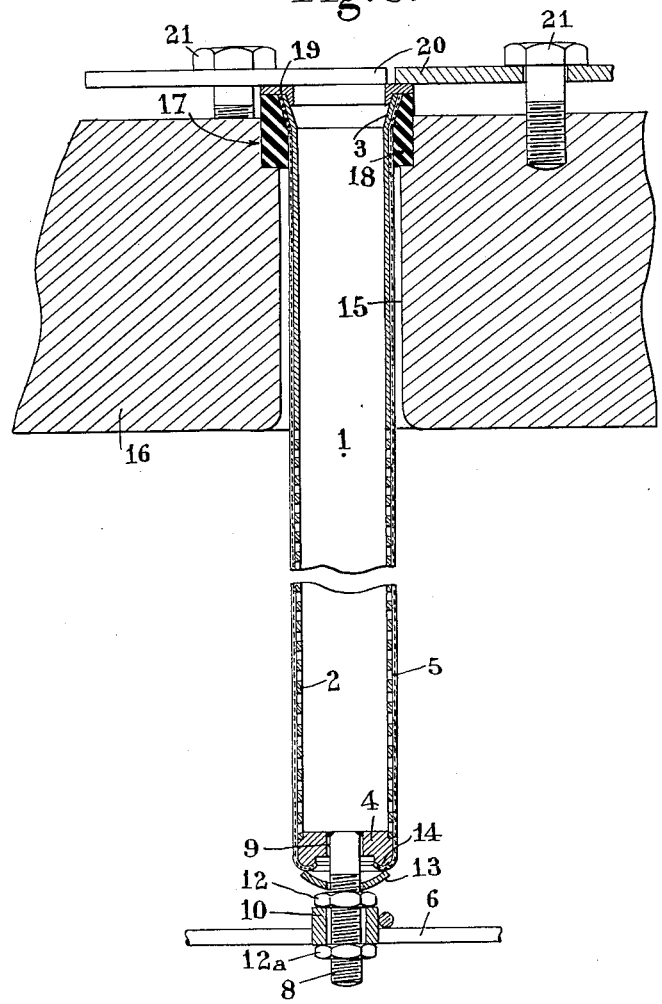

_United States Patent Office_

3,225,933
Patented Dec. 28, 1965

3,225,933
MOUNTING FOR CLUSTER OF FILTER TUBES
Jacques Rolland Alexandre Berline, 72 Rue des Sablons, Mareil-Marly, Seine-et-Oise, France
Filed July 25, 1961, Ser. No. 126,568
Claims priority, application France, July 27, 1960, 834,347
3 Claims. (Cl. 210—333)

The present invention has for its object improvements to filters comprising a cluster of conventional filtering tubes made of perforated sheet metal or expanded metal and covered with a sheath made of metal or textile fabric, in which the product to be filtered enters from outside the filter casing and passes through said filtering tubes from the outside to the inside, the filtrate finally escaping through a pipe provided for the purpose at the top of the filter.

Cleaning is carried out periodically by counter-streaming the filtrate, this counter-streaming effect being generally obtained by the expansion of the compressed air accumulated at the top of the filter, or by the input of air, gas or steam through a pipe at the top of the filter, and being initiated after the unfiltered liquid inlet has been shut off at the bottom of the filter and after a discharge pipe also located at the bottom of the filter has been opened.

According to a first characteristic of the invention, and with a view to facilitating cleaning of the tubes, the latter are secured to their supporting plate with an interposed sealing gasket the elasticity of which is such that it permits vibration to take place during the cleaning operation.

To this end, each tube, which is long in relation to its diameter, is suspended from the supporting plate, there being interposed a gasket which is compressed to a degree sufficient to ensure tightness but not destruction of its elasticity.

With this arrangement, when the fluid is being counter-streamed, namely flowed from the inside to the outside, each tube mounted elastically thus is subjected to vibrations which facilitate detachment of the solid matter caking its external sheath, thereby ensuring very rapid cleaning.

The tubes may be flared at their tops and be placed in sockets provided in a substantially circular supporting plate, with an interposed annular gasket made of plastic, rubber, or the like, which is compressed when a downward pressure is exerted on the tube, and this pressure, which is applied via an annular metal washer or the like disposed above said gasket, is generated by some suitable device such as a washer which is tightened down by a nut and bolt against the supporting plate and which exerts the pressure against three tubes at once, or, alternatively, by a stirrup which thrusts against the three individual washers of three adjacent tubes, or by any other mechanical means ensuring proper positioning of the filtering tubes With this arrangement, the tubes can be removed from their sockets individually, either through the top or the bottom, thereby greatly facilitating the expansion and replacement of worn sheaths.

The compressed gaseous fluid designed to provide the counter-streaming pressure against the open surface of the washing liquid, may be the air which is imprisoned in the dome by the filtrate when the pressure is increased by shutting off the discharge cock. The counter-streaming pressure then becomes the limit pressure provided by the pump supplying the filter. Alternatively, make-up compressed air from an external source may be used in lieu, or in addition to this compressed air. In certain cases, however, expansion of the air under pressure streaming through the filtering tubes may bring about a drop in temperature such that a deposit of solid matter occurs.

In sugar refining, in particular, there often occurs a precipitation of calcium carbonate due to the presence of this salt in over-saturating quantities in the juices, thereby resulting in rapid fouling of the filtering tubes and the need, after a certain working time, to re-condition the tubes, an operation which is both costly and inconvenient.

To avoid this inconvenience, the counter-streaming may be produced by means of steam under pressure which, after the cleaning operation, is streamed through the filtering tubes, which it thus sterilizes.

The use of steam in this way is a very worthwhile operation since, at the end of the cleaning operation, namely when expansion takes place, a very high temperature in excess of 100° C. is still available, which eliminates any danger of crystallizing or mineralizing of the deposits within the pores of the filtering tubes.

In addition, this method is highly economical since, in sugar refineries for example, operators always have available a steam supply network from which they can draw the steam needed for the cleaning operation.

If necessary, superheated steam may be used to complete sterilization of the filter.

The following description, given with reference to the accompanying drawings, of an embodiment of the invention, will give a clear understanding of how the invention may be performed.

In the drawings:

FIGURE 3 is a vertical section through the line III—III in FIG. 2.

Figure 1:
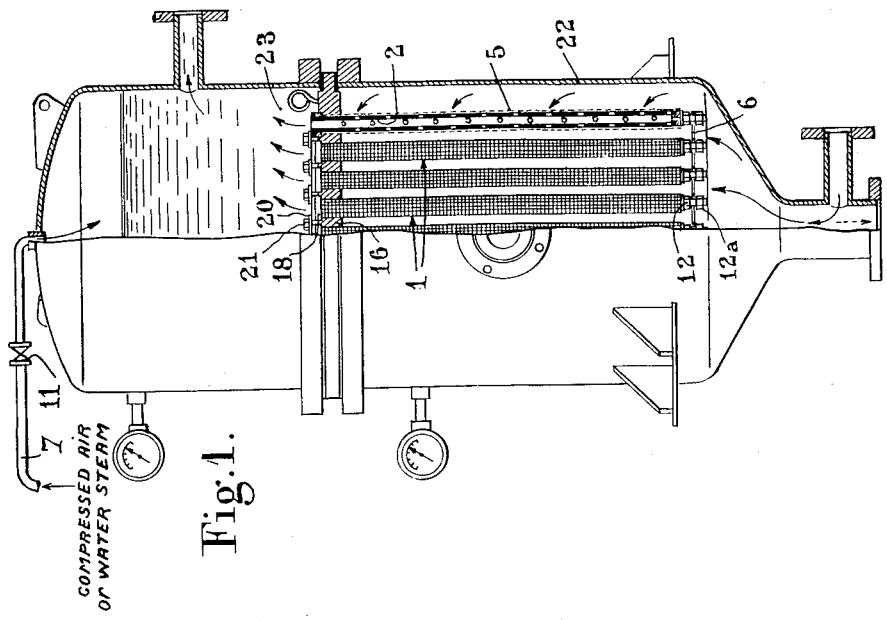
FIGURE 1 is a part elevation, part sectional view of a filter according to the invention.
Figure 2:
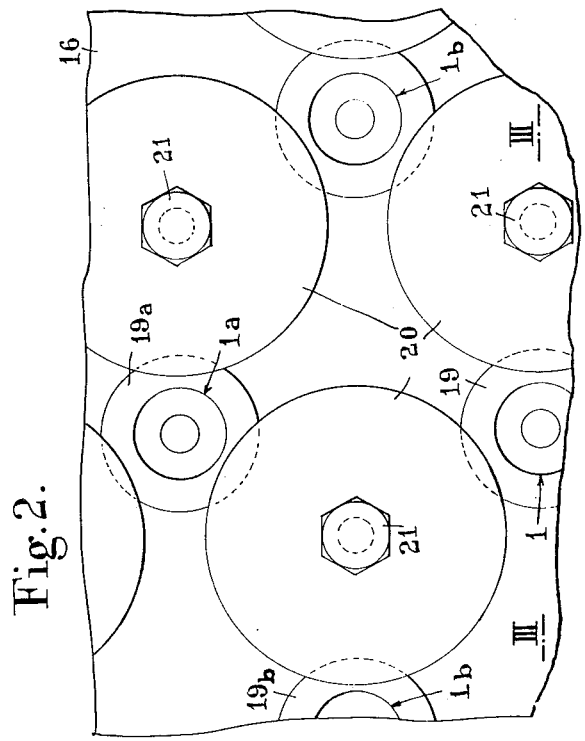
FIGURE 2 is a plan view, seen from below, of a detail of the supporting plate and the means for securing the tubes of the cluster.

Each of the tubes, collectively designated by the reference numeral 1, consists of a metal core 2 made of rolled and welded perforated sheet metal, and comprises a flared portion 3 at its top and is rigidly united with an end-piece 4 at its bottom end.

Over this assembly constituting each individual tube is slipped a fabric sleeve or sheaths 5 capable of withstanding temperatures in excess of 100° C. the fabric used being a synthetic fabric such as Terylene or the like.

At their bottoms, the filtering tubes are fixed to a resilient metal lattice 6 arranged transversely and horizontally inside the container 22.

In the example illustrated, a threaded stud 8 is screwed into a central hole 9 is each end-piece 4 and passes through a ring or bush 10 which in turn passes through the meshes of the metal lattice 6, to which it is welded. The said threaded stud 8 is retained in a vertical position in the bush 10 by a nut 12 and a locknut 12a arranged one on each side of the bush.

The reference numeral 13 designates a washer inserted between the nut 12 and the end-piece 4, its purpose being to seal off the fabric sheath 5 by applying it in leakproof fashion against a bottom peripheral sealing strip of the end-piece 4.

At their upper ends, the filtering tubes 1 pass through orifices 15 arranged in staggered fashion on a supporting plate 16, and said tubes are secured to this supporting plate in the following manner: the orifices 15 in the supporting plate 16 terminate in a recess 17 of larger diameter in which is accommodated a sealing gasket 18 interposed between the flared portion 3 at the top of the tube 2 and said recess 17. The gasket 18 is made of some deformable elastic material such as rubber, a synthetic material or the like, adapted to enable it to be crushed to some extent when the tube is tightened on to the supporting plate. This tightening operation may be accomplished by different means, but it will be found convenient, as will be seen hereinbelow, to provide separate fixing means for each group of tubes. Thus, in the example chosen for illustration purposes, tightening is achieved by means of stirrups, washers or the like, 20, disposed across three staggered tubes 1, 1a and 1b, and placed astride the edges of the tube-retaining rings 19, 19a and 19b respectively.

The center of each stirrup or the like is fixed to the supporting plate 16 by a bolt 21, for example, screwed into the upper face of the supporting plate.

This arrangement is an extremely advantageous one since, in order to obtain vibration of the filtering tubes as a whole during the cleaning operation, it is necessary to accurately adjust the clamping pressure exerted by the tube-retaining rings against their sealing gaskets, in order, firstly, to very precisely limit the degree of crushing of the gaskets and, secondly, to adjust the gap between these rings and the walls of the recesses 17.

Such adjustment could not be correctly effected if a single pressure plate were to be used above the supporting plate 16 to apply the filter tube retaining rings correctly against said supporting plate, owing to manufacturing tolerances.

On the other hand, it will be appreciated that the fixing method illustrated enables this adjustment to be carried out accurately.

The partial crushing sustained during the tightening operation by the gaskets 18 permits simultaneous vertical and horizontal relative displacement of the upper end of each filtering tube, such displacement being also allowed by the inherent resiliency of the metal lattice 6 to which the bottoms of the filtering tubes are fixed. The tubes of the cluster dip into the filter casing 22 containing the liquid to be filtered, the said liquid being normally introduced from the outside, through the fabric sheath 5 and into the filtering tubes, the filtrate passing through said tubes and rising to the top of the filter into the space 23 located above the supporting plate 16, whence it is evacuated.

For the cleaning operation, the filtrate accumulated in the dome is counter-streamed in response to the pressure exerted by the gaseous fluid forming a cushion in the dome or introduced thereinto by the conduit controlled by a cock 11, and said filtrate then streams back through the tubes and escapes through their holes, detaching in the process the solid matter which cakes on to the outer face of the fabric sheaths during the filtration process. This clearing of the caked matter is assisted, on the one hand, by the swirling of the unfiltered liquid that remains in the filter casing and which is suddenly discharged through the full-flow valve at the bottom of the filter and, on the other hand, by the vibration set up in the cluster of elastically mounted tubes by said swirling.

These three factors operating simultaneously ensure virtually instantaneous clearing of the cake sludge.

At the end of the cleaning operation the stream of gaseous fluid in turn passes through the filtering tubes, sterilizing them in the process if the fluid concerned is steam, and detaching the ultimate particles of solid matter still adhering to the fabric sheaths.

It is to be understood that the form of embodiment of the invention described hereabove has been given only by way of example and that many modifications may be brought thereto without thereby departing from the scope of the invention. Thus, in particular, the clamping members 20. instead of consisting of circular washers, may be star-shaped, each point of a star being assigned to a tube.

Similarly, instead of being common to three tubes, said clamping members may be common to two, four or any number whatsoever of tubes.

What I claim is:

1. In a filter comprising a cluster of vertical filter tubes consisting each of a perforated tube surrounded by a filtering sheath and outflared at its upper end and through which the product to be filtered is caused to flow from the exterior to the interior before escaping through the top portion of the tube, said filter tubes being adapted to be cleaned by causing the forced filtrate to flow in the opposite direction, a horizontal plate solid with the upper portion of the filter and apertured to permit the passage with play of the upper end of each tube therethrough, a circular groove formed in the upper edge of each aperture, a resilient gasket fitting in each groove and adapted elastically to engage the outflared upper edge of each tube, a flange removably mounted with respect to each tube for securing the upper end of each tube on the relevant gasket, washers disposed above said supporting plate and engaging said flanges with their edges, and means for adjustably clamping said washers on said supporting plate.

2. In a filter comprising a cluster of vertical filter tubes consisting each of a perforated tube surrounded by a filtering sheath and outflared at its upper end and through which the product to be filtered is caused to flow from the exterior to the interior before escaping through the top portion of the tube, said filter tubes being adapted to be cleaned by causing the forced filtrate to flow in the opposite direction, a horizontal plate solid with the upper portion of the filter and apertured to permit the passage with play of the upper end of each tube therethrough, a circular groove formed in the upper edge of each aperture, a resilient gasket fitting in each groove and adapted elastically to engage the outflared upper edge of each tube, a flange removably mounted with respect to each tube for securing the upper edge of each tube on the relevant gasket, washers disposed above said supporting plate, each having an orifice and engaging with their edges the upper faces of said securing flanges, said washers overlapping with their edges a plurality of flanges, and bolts passing through said orifices of said washers, the top of said supporting plate having holes adapted to be engaged by said bolts for tightening said washers on said flanges in order to seal the outflared edges of said tubes on their gaskets while permitting the vibration of the tubes.

3. In a filter comprising a cluster of vertical filter tubes consisting each of a perforated tube surrounded by a filtering sheath and outflared at its upper edge, the product to be filtered being adapted to flow from the exterior to the interior before escaping through the top portion of the tube, said filter tubes being adapted to be cleaned by causing the forced filtrate to flow in the opposite direction, a horizontal plate solid with the upper portion of the filter and apertured to permit the passage with play of the upper end of each tube therethrough, a circular groove formed in the upper edge of said aperture, a resilient gasket fitting in each groove and adapted to elastically engage the outflared upper edge of each tube, a flange removably mounted with respect to each tube for securing the upper edge of each tube on the relevant gasket, washers disposed above said supporting plate and engaging with their edges the upper faces of said securing flanges, said washers overlapping with their edges a plurality of said flanges, bolts passing through the orifices of said washers, the top of said supporting plate having holes adapted to be engaged by said bolts for tightening said washers on said flanges in order to seal the outflared edges of said tubes on their gaskets while permitting the vibration of the tubes, a plug closing the lower end of each tube, and having an orifice centrally disposed therein, a screw-threaded rod inserted in said orifice, said filter having a hole at its bottom in axial alignment with each tube and engageable by said rod for securing the base of the relevant tube, a ring member surrounding said rod, a metal grid solid with said ring member a washer inserted between the tube base and the ring member, a nut engaging the screw-threaded rod in juxtaposition to one end of the ring member and a nut engaging the screw-threaded rod in juxtaposition to the other end of the ring member, said nuts engaging said ring member ends whereby said rod is fixed against axial motion.

References Cited by the Examiner

UNITED STATES PATENTS

| | | | |
|---|---|---|---|
| 217,442 | 7/1879 | Belcher | 210—82 |
| 662,252 | 11/1900 | Crosscup | 210—333 |
| 2,562,699 | 7/1951 | Cooperson et al. | 210—333 X |
| 2,784,846 | 3/1957 | Olson et al. | 210—333 |
| 2,862,622 | 12/1958 | Kircher et al. | 210—82 |

FOREIGN PATENTS

| | | |
|---|---|---|
| 1,227,333 | 3/1960 | France. |
| 367,148 | 10/1920 | Germany. |

FRANK W. LUTTER, *Primary Examiner.*

REUBEN FRIEDMAN, HERBERT L. MARTIN,
*Examiners.*

L. J. WILBURN, *Assistant Examiner.*